United States Patent Office 2,857,309
Patented Oct. 21, 1958

2,857,309

DIMETHYLBENZYL CHRYSANTHEMUMATES AS INSECTICIDES

William F. Barthel, Catonsville, Md.

No Drawing. Application October 29, 1957
Serial No. 693,211

7 Claims. (Cl. 167—30)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The patent rights for the United States in any invention in the patent to be granted on this application are dedicated to the public.

This invention relates to two new organic compounds; namely the 2,4-dimethylbenzyl and the 3,4-dimethylbenzyl esters of cis, trans, d,l-chrysanthemumic acid. The invention also concerns insecticide compositions containing the above esters and methods of applying these compositions for destroying insects. Further objects and advantages of the invention will be obvious from the description herein.

Since the introduction of DDT and other chlorinated insecticides many instances of insects becoming resistant to these insecticides have been reported. The application of greater amounts of these insecticides cannot be tolerated because their residues are toxic to warm-blooded animals. The newer phosphorus insecticides appear to be following a similar fate.

This situation has prompted a search for insecticides that can be used without harm to the persons applying them or to those that may ingest food on which the chemicals are applied. Also, insecticides are needed to replace those of foreign origin and therefore unavailable in time or war or emergency. Finally, lower cost insecticides are needed so that a more general attack on disease-carrying and crop-destroying insects may be made without such attack being seriously handicapped by the high cost of the insecticides.

The present invention has accomplished these aims for controlling certain insects. The 2,4-dimethylbenzyl and the 3,4-dimethylbenzyl chrysanthemumates were found to be highly toxic to a wide variety of insect pests, e. g., house fly, southern army worm, and mosquito larvae.

The toxicity to insects of the 2,4-dimethylbenzyl and the 3,4-dimethylbenzyl chrysanthemumate is illustrated by the results given in Table I and II.

Table I.—Toxicity of 2,4-dimethylbenzyl chrysanthemumate to various insects

| Insect | Conc. | Percent Kill |
| --- | --- | --- |
| House fly-adult | 20 mg./ml. | 100 |
|  | 10 mg./ml. | 87 |
| Mosquito larvae | 1.0 p. p. m. | 100 |
|  | 0.1 p. p. m. | 98 |
|  | 0.05 p. p. m. | 70 |
|  | 0.025 p. p. m. | 56 |
| Southern army worm | 0.01% | 30 |
| Boll weevil | 1.0% | 100 |
|  | 0.5% | 70 |
| Saltmarsh caterpillar | 0.5% | 100 |
|  | 0.25% | 100 |
|  | 0.1% | 100 |
| Body louse | 1% solution | Impregnated cloth, 100% effective for 31 days. |

Table II.—Toxicity of 3,4-dimethylbenzyl chrysanthemumate to various insects

| Insect | Conc. | Percent Kill |
| --- | --- | --- |
| House fly-adult | 20 mg./ml. | 90 |
|  | 1.0 p. p. m. | 100 |
| Mosquito larvae | 0.1 p. p. m. | 99 |
|  | 0.05 p. p. m. | 88 |
|  | 0.025 p. p. m. | 84 |
| Saltmarsh caterpillar | 0.05% | 100 |
|  | 0.01% | 65 |
| Body louse | 1% solution | Impregnated cloth, 100% effective for 31 days. |

The 2,4- and 3,4-dimethylbenzyl chrysanthemumates possess desirable physical properties. They are miscible with the solvents regularly used in commercial insecticide compositions, e. g., kerosene or naphtha, and are also readily mixed with an inert carrier or diluent for application as a dust. They may be formulated with an emulsifier for use as a water emulsion. In addition, they are readily soluble in liquefied gases for application in insecticidal aerosols.

These new esters approach the requirements of an ideal synthetic insecticide. They are of low toxicity to man but are highly toxic to insects; the raw materials for their manufacture are of domestic origin and are available from cheap petroleum sources.

These esters can be made by transesterification from ethyl chrysanthemumate as well as by the more expensive acid chloride process. Transesterification is illustrated as follows:

EXAMPLE 1

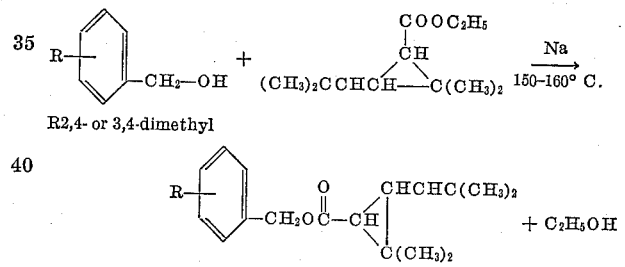

Equimolar amounts of the appropriate dimethylbenzyl alcohol and ethyl chrysanthemumate are heated in a flask with a Dean-Stark water separator. When the temperature reaches 150°, 0.01-mole pieces of sodium are added and ethyl alcohol starts to distill over. Additional 0.01-mole pieces of sodium are added when the formation of alcohol slows down until the required amount of alcohol distills over (about eight additions).

The mixture is then cooled and taken up in ether. The ether solution is washed with water, dilute hydrochloric acid, saturated sodium bicarbonate, and then saturated brine. After drying over sodium sulfate the ether is removed and the product distilled.

The chrysanthemumates have the following physical properties:

|  | 2,4-dimethyl-benzyl | 3,4-dimethyl-benzyl |
| --- | --- | --- |
| Boiling point | 167–170° C. at 2 mm. | 148–152° C. at 0.5 mm. |
| Refractive index, $(n_D{}^{25})$ | 1.5161 | 1.5166. |

I claim:
1. A compound selected from the group consisting of 2,4-dimethylbenzyl chrysanthemumate and 3,4-dimethylbenzyl chrysanthemumate.
2. 2,4-dimethylbenzyl chrysanthemumate.
3. 3,4-dimethylbenzyl chrysanthemumate.

4. An insecticide comprising a member selected from the group consisting of 2,4-dimethylbenzyl chrysanthemumate and 3,4-dimethylbenzyl chrysanthemumate in an inert carrier.

5. An insecticide comprising 2,4-dimethylbenzyl chrysanthemumate in an inert carrier.

6. An insecticide comprising 3,4-dimethylbenzyl chrysanthemumate in an inert carrier.

7. The method of killing insects comprising contacting them with a compound selected from the group consisting of 2,4-dimethylbenzyl chrysanthemumate and 3,4-dimethylbenzyl chrysanthemumate.

References Cited in the file of this patent

King: Agriculture Handbook, No. 69, May 1954, p. 113. (Item No. 3217.)